(12) United States Patent
Bosshammer

(10) Patent No.: US 7,288,322 B2
(45) Date of Patent: Oct. 30, 2007

(54) SELF-ADHESIVE, ADDITION CROSS-LINKING SILICONE-RUBBER BLENDS, METHOD FOR THEIR PRODUCTION, METHOD FOR PRODUCING COMPOSITE MOLDED PARTS AND USE OF THE LATTER

(75) Inventor: Stephan Bosshammer, Köln (DE)

(73) Assignee: GE Bayer Silicones GmbH & Co. KG, Leverkusen (DE)

( * ) Notice: Subject to any disclaimer, the term of this patent is extended or adjusted under 35 U.S.C. 154(b) by 35 days.

(21) Appl. No.: 10/503,865

(22) PCT Filed: Feb. 3, 2003

(86) PCT No.: PCT/EP03/01030

§ 371 (c)(1),
(2), (4) Date: Aug. 6, 2004

(87) PCT Pub. No.: WO03/066736

PCT Pub. Date: Aug. 14, 2003

(65) Prior Publication Data

US 2005/0089696 A1    Apr. 28, 2005

(30) Foreign Application Priority Data

Feb. 6, 2002 (DE) ................. 102 04 893

(51) Int. Cl.
*B32B 25/20* (2006.01)

(52) U.S. Cl. .......... 428/447; 528/31; 528/32; 528/43; 528/15; 528/19

(58) Field of Classification Search ........ 528/32, 528/43, 31, 15, 19; 428/447
See application file for complete search history.

(56) References Cited

U.S. PATENT DOCUMENTS

| | | | |
|---|---|---|---|
| 4,082,726 A | 4/1978 | Mine et al. ............ 260/46.5 |
| 4,087,585 A | 5/1978 | Schulz ................. 428/429 |
| 4,645,815 A | 2/1987 | Lewis ................... 528/15 |
| 5,023,288 A | 6/1991 | Hirai et al. ............. 524/268 |
| 5,336,806 A | 8/1994 | Qi ....................... 562/494 |
| 5,366,805 A | 11/1994 | Fujiki et al. ............ 428/412 |
| 5,405,896 A | 4/1995 | Fujiki et al. ............ 524/265 |
| 5,418,065 A | 5/1995 | Fujiki et al. ............ 428/451 |
| 5,536,803 A | 7/1996 | Fujiki et al. ............ 528/15 |
| 6,127,503 A | 10/2000 | Fujioka et al. .......... 528/15 |
| 6,743,515 B1 | 6/2004 | Müller et al. ........... 428/447 |
| 2001/0011117 A1 | 8/2001 | Pesch et al. ............ 525/103 |

FOREIGN PATENT DOCUMENTS

| | | |
|---|---|---|
| DE | 36 35 236 | 5/1987 |
| DE | 199 43 666.5 | 3/2001 |
| EP | 0 350 951 | 1/1990 |
| EP | 0 691 364 | 1/1996 |
| EP | 0 875 536 | 11/1998 |
| EP | 1 085 053 | 3/2001 |
| EP | 1 106 662 | 6/2001 |

OTHER PUBLICATIONS

A.L. Smith (Ed.): The Analytical Chemistry of Silicones, J. Wiley & Sons 1991, vol. 112, p. 356 ff in Chemical Analysis by J.D. Winefordner.
Schwarz; Ebeling; Furth: Kunststoffverarbeitung [Plastic Processing], Vogel-Verlag, ISBN: 3-8023-1803-X, (1978).
Walter Michaeli: Einführung in die Kunststoffverarbeitung [Introduction to Plastic Processing], Hanser-Verlag, ISBN 3-446-15635-6, (1992).

*Primary Examiner*—Kuo-Liang Peng
(74) *Attorney, Agent, or Firm*—Norris, McLaughlin & Marcus PA

(57) ABSTRACT

Self-adhesive, addition cross-linking silicone-rubber blends which have good adhesion to substrates but which release from molds used to prepare molded parts from them.

18 Claims, No Drawings

SELF-ADHESIVE, ADDITION CROSS-LINKING SILICONE-RUBBER BLENDS, METHOD FOR THEIR PRODUCTION, METHOD FOR PRODUCING COMPOSITE MOLDED PARTS AND USE OF THE LATTER

This is a 371 of PCT/EP03/01030 filed 3 Feb. 2003 (international filing data).

The present invention relates to addition cross-linking silicone-rubber blends, a method for their production, and a method for producing composite molded parts and their use.

BACKGROUND OF THE INVENTION

The self-adhesive, addition cross-linking silicone-rubber blends according to the invention are characterized by good adhesion to substrates without the necessity of special handling for the molds used for producing the molded parts, which makes possible release of the addition cross-linked silicone-rubber blends from the mold. In addition, generally no subsequent curing of the composite molded parts is necessary.

A series of methods have been suggested to achieve an adhesive bond between addition cross-linking silicone elastomers and their substrates. One option is the use of a so-called primer that is used for pretreatment of the substrate surface. This requires an additional step and handling of solvents during processing. Both are disadvantageous. Another option consists of achieving adhesion of addition cross-linking silicone elastomers to substrates by the addition of one or more additive to the non-cross-linked silicone-rubber blend.

One other variation provides for the production of a thermoplastic-siloxane blend in which different siloxanes are mixed into the thermoplastic matrix before molding and the surface of molded parts of this thermoplastic blend are bonded with an addition cross-linking silicone-rubber blend. U.S. Pat. No. 5,366,806 hereby claims hydrogen siloxane with an additional alkenyl group in the thermoplastic matrix that is connected with adhesion to addition cross-linked polyorganosiloxane rubber that can preferably contain other organic functional SiH adhesion promoters.

U.S. Pat. No. 5,366,805 discloses a polycarbonate that contains siloxane copolymers or terpolymers containing hydrogen siloxane with epoxy or aryl groups. U.S. Pat. No. 5,418,065 suggests, instead of a siloxane-containing thermoplastic, a polypropylene terpolymer that contains addition cross-linking polyorganosiloxane rubber and SiH siloxanes containing epoxy, that are bonded during cross linking. The adhesion occurs e.g. during 8 min at 120° C. In this process, the thermoplastic part is injected immediately before the application of the silicone-rubber. The system makes possible the mold release of the composite parts from a metal mold.

Another solution is the preparation of addition cross-linking polyorganosiloxane rubbers that contain one or more additives, depending on the type of thermoplastic substrate and that can be bonded on this thermoplastic under different conditions during cross-linking. In this process, it is desirable to bond especially thermoplastics with high softening temperatures with silicone-rubber and, in contrast, to keep the adhesion to metallic mold material, i.e. generally steel, as low as possible.

According to U.S. Pat. No. 4,087,585, for example a good adhesion to aluminum is achieved by the use of two additives, a short-chain polysiloxane with at least one SiOH group and one silane with at least one epoxy group and an Si-bound alkoxy group. According to J. Adhesion Sci. Technol., Vol. 3, No. 6, pp 463-473 (1989), good adhesion to various metals and plastics is achieved by addition of an epoxy silane in combination with a homopolymeric cross linker. In EP-A 875 536, an improved adhesion on various plastics is achieved by use of an alkoxysilane with an epoxy group and a hydrogen silane with at least 20 SiH functions per molecule, whereby these mixtures are also distinguished by improved reactivity.

EP 350 951 describes the use of a combination of acryl or methacryl alkoxysilane with an epoxy-functional silane and a partial allyl ether of a multivalent alcohol as an additive to achieve permanent adhesion of addition cross-linking silicone elastomers on glass and metal.

These mixtures have the disadvantage that they also exhibit good adhesion to metals and are thus problematic in processing with uncoated metal molds.

DE 199 43 666.5 discloses that, by addition of a combination of glycidoxypropyltrimethoxysilane and methacryloxypropyltrimethyoxysilane, a good adhesion to polyamide and polybutylenterephthalate is achieved by subsequent curing of the composite parts with easily mold release capability from uncoated steel molds. However, a relatively high quantity of silanes is used, and to achieve good final adhesion a subsequent curing of the composite molded parts is recommended, which involves an additional working step.

U.S. Pat. No. 4,082,726 discloses the use of a terpolymer, i.e. of a siloxane, that consists of at least 3 different siloxy groups. In addition to Si epoxy groups, this can include Si-phenyl, SiH and other siloxy units. These epoxy siloxanes are used in addition to the almost optional alkenyl siloxanes A) and one hydrogen siloxane B) in order to produce adhesion between a thermoplastic substrate and an addition cross-linking polyorganosiloxane. No preferred concentrations for the organic function units of silicon are disclosed. The presence of the terpolymer containing epoxy causes both a thermoplastic and a metal adhesion.

U.S. Pat. No. 5,405,896 discloses, instead of the siloxane terpolymers containing epoxy, a copolymer and/or terpolymer with at least one phenylene group containing oxygen and at least one SiH group. The silicone-rubbers are bonded to the thermoplastic surface, for example during 8 min at 120° C. The mold release is successful in a non-coated metal mold.

U.S. Pat. No. 6,127,503 suggests, instead of the siloxane copolymers and/or terpolymers containing oxygen, a terpolymer with at least one phenyl and/or phenylene unit, a nitrogen-containing unit and an SiH group. The silicone-rubbers are cured with adhesion to the thermoplastic surface, e.g. during 10 min at 120° C.

EP 686 671 (U.S. Pat. No. 5,536,803) describes the use of an organohydrogen polysiloxane as an additive, whereby at least 12 mol-% of the monovalent Si-bound organic radicals are aromatic groups. In this case, adhesion to ABS was actually found, which was not quantified, and an easy mold release capability with metallic surfaces; an evaluation of the typical technical thermoplastics, e.g. polyamide, polybutylene terephthalate or polyphenylene sulfide was not carried out. A specific application area for these thermoplastics was not seen. Also, no preferred range for the SiH content of the corresponding siloxane components was disclosed. The silicone-rubber was brought to adhesion to the thermoplastic surface, e.g. over 100 sec. to 8 min at 60-100° C. during cross-linking.

The object of the present invention is to provide addition cross-linking silicone-rubber blends with good adhesion on various substrates, especially technical thermoplastics with high softening temperature such as polyamide, polytbutylene terephthalate or polyphenylene sulfide without the necessity of the tools being coated or treated with mold separating agents for processing in an automatic injection molding machine to prevent adhesion to the tools and generally without the need for the composite parts to be subsequently cured. To do this, the target is additional components that are simple and can be manufactured cost-effectively for silicone-rubbers that can also be added separately as separate components into commercially known, preferably 2-component, rubber.

SUMMARY OF THE INVENTION

It has now been found that addition cross-linking mixtures that solve this task, comprise, in addition to the usual components, an SiH-rich organohydrogen polysiloxane as cross-linker, an organohydrogen polysiloxane containing a phenyl group and at least one alkoxy silane or alkoxy siloxane with at least one epoxy group achieve this object and the phenyl content can be minimized in this combination.

DETAILED DESCRIPTION

The object of the invention is thus addition cross-linking silicone-rubber blends containing:
a) at least one linear or branched organopolysiloxane with at least two alkenyl groups with a viscosity of 0.01 to 30,000 Pa·s,
b) at least an organohydrogen siloxane, each with at least 2 SiH units per molecule with the criteria that
  i) at least one of the organohydrogen siloxanes has a content of more than 7 mmol SiH/g,
  ii) at least one of the organohydrogen siloxanes has at least one aromatic group in the molecule, and
  iii) the characteristics i) and ii) can be implemented in the same organohydrogen siloxane or in different organohydrogen siloxanes,
c) at least one Pt, Ru and/or Rh catalyst,
d) at least one alkoxysilane and/or alkoxysiloxane, each of which has at least one epoxy group,
e) optionally at least one inhibitor,
f) optionally at least one filler, optionally surface-modified, and
g) optionally at least one additive,
whereby the molar ratio of the entire quantity of the SIH groups to the total quantity of Si-bound alkenyl groups is at least 0.7, preferably more than 1 and no more than 7. This means the quantity of component b) is coordinated to the alkenyl (preferably vinyl) content of a) in such a way that this condition is fulfilled.

The quantity ratio of a) to component b) can basically be varied within wide limits in spite of the SiH to Si-alkenyl ratio limited in this way.

Preferably, the addition cross-linking silicone-rubber blends according to the invention exhibits the following composition (parts are parts by weight):
100 parts polyorganosiloxane(s) a)
0.2-60 parts organohydrogen siloxane(s) b)
1-1000 ppm related to the metal content of the catalyst c) and the total quantity of the silicone-rubber blend
0.01-10 parts of the expoxyalkoxy silane and/or epoxy-alkoxy siloxanes d)
0-2 parts of the inhibitor e)
0-300 parts of the filler, optionally surface-modified f)
0-15 parts of the additive g).

The addition cross-linking silicone-rubber blend according to the invention contains a) at least one linear or branched organopolysiloxane having at least two alkenyl groups with a viscosity of 0.01 to 30,000 Pa·s.

The organopolysiloxane a) can be a branched polysiloxane. The term "branched polysiloxane" also includes macrocyclic and/or spirocyclic structures, i.e. these are solids melting under 90° C. with melt viscosities in the named range or solids that are soluble in the usual solvents or siloxane polymers.

The component a) essentially has no Si—H groups.

The organopolysiloxane a) is preferably a linear or branched polysiloxane that can exhibit the following siloxy units:

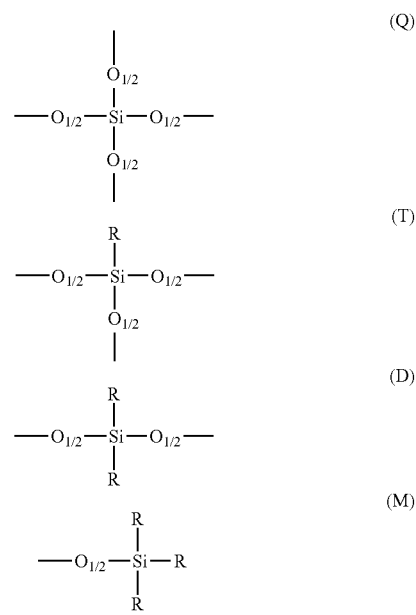

wherein the substituents R can be equal or different and selected from the group consisting of
  a straight-chain, branched or cyclic alkyl radical with up to 12 carbon atoms, that may be substituted with at least one substituent, selected from the group that consists of phenyl and halogen, especially fluorine,
  a straight-chain, branched or cyclic alkenyl radical with up to 12 carbon atoms,
  a phenyl radical,
  hydroxyl and
  a straight-chain, branched or cyclic alkoxy radical with up to 6 carbon atoms, or two substituents R from different siloxy units form together a straight-chain, branched or cyclic alkandiyl radical with 2 to 12 carbon atoms between two silicon atoms, with the criterion that at least two substituents R, which can be the same or different, represent the alkenyl radical per molecule.

The siloxy units can be divided statically or can be present arranged in blocks.

A preferred, straight-chain, branched or cyclic alkyl radical with up to 12 carbon atoms is methyl.

A preferred alkyl radical substituted with phenyl includes e.g. styryl (phenylethyl).

A preferred alkyl radical substituted with halogen includes e.g. a fluoroalkyl radical with at least one fluorine atom, e.g. perflouroalkylethyl radicals, e.g. preferably 3,3,3-trifluoropropyl or perfluoroalkylether and/or epoxy-perfluoroalkylether.

Straight-chain or branched alkenyl radicals with 2 to 8 carbon atoms include e.g. vinyl, allyl, hexenyl, octenyl, vinylphenylethyl, cyclohexenylethyl, ethylidene norbornyl and/or norbornenyl ethyl or limonyl. Vinyl is especially preferred.

A preferred straight-chain, branched or cyclic alkoxy radical with up to 6 carbon atoms includes e.g. methoxy and ethoxy.

Preferred radicals are thus methyl, phenyl, vinyl and 3,3,3-trifluoropropyl.

Preferred siloxy units include e.g. alkenyl units such as dimethylvinylsiloxy, methylvinylsiloxy, vinylsiloxy units, alkyl units, such as trimethylsiloxy, dimethylsiloxy and methylsiloxy units, phenylsiloxy units, such as triphenylsiloxy, dimethylphenylsiloxy, diphenylsiloxy, phenylmethylsiloxy and phenylsiloxy units, phenyl-substituted alkylsiloxy units, such as (methyl)(styryl)siloxy.

Preferably, the organopolysiloxane a) has a number of siloxy units from 100 to 10,000, especially preferably 300 to 1000.

The alkenyl content of the organopolysiloxane a) preferably lies in the range from 0.003 mmol/g to 11.6 mmol/g.

The organopolysiloxane a) has a viscosity of 0.001 to 30 kpa·s, more specially preferred 5 to 200 Pa·s. The viscosity is determined according to DIN 53 019 at 20° C.

In a preferred embodiment of the invention, the organopolysiloxane a) comprises a mixture of different organopolysiloxanes with different alkenyl (preferably vinyl) contents, whose alkenyl and/or vinyl contents preferably differ by at least a factor of 2.

A preferred mixture of the organopolysiloxanes a) is a mixture that comprises an alkenyl-group-rich (preferably vinyl-group-rich) organopolysiloxane and comprises at least one, preferably at least two and especially preferably two organopolysiloxanes with low alkenyl groups (preferably low vinyl groups).

The organopolysiloxane rich in alkyl groups (preferably vinyl groups) preferably has an alkenyl group content of more than 0.4 mmol/g to 11.6 mmol/g.

These siloxane polymers can preferably represent branched polysiloxanes, as defined above, i.e. solids that melt under 90° C. and/or solids that are soluble in the usual solvents or siloxane polymers, The organopolysiloxane with low alkenyl groups (preferably low vinyl group) has an alkenyl group content of less than 0.4 mmol/g, preferably 0.02 to 0.4 mmol/g.

The alkenyl content is determined here using $^1$H-NMR, see A. L. Smith (Ed.): The Analytical Chemistry of Silicones, J. Wiley & Sons 1991, Vol. 112, p. 356 ff in Chemical Analysis by J. D. Winefordner.

Preferably, the alkenyl group content is adjusted using alkenyl dimethylsiloxy units. Because of this, in addition to the different alkenyl contents, a different chain length results and thus a different viscosity.

Because of the use of the mixtures described above, with different alkenyl (preferably vinyl) contents, it is possible to optimize the mechanical characteristics, such as expansion and tear propagation resistance of the cross linked silicone-rubber blends according to the invention.

The mixture ratio of the alkenyl-group-rich organopolysiloxanes a) preferably lies at 0.5 to 30 weight-%, related to the total quantity of the organopolysiloxane a). The total alkenyl content of a mixture of various organopolysiloxane with different alkenyl (preferably vinyl) content should preferably be less than 0.9 mmol/g.

The organopolysiloxanes a) can be produced according to known methods, e.g. with alkaline or acid catalysts, as in U.S. Pat. No. 5,536,803, column 4.

The quantity of organopolysiloxanes a) can preferably be between about 20.5 and 99.8 weight-% related to the total quantity of the silicone of the silicone-rubber blend.

The organopolysiloxanes rich in alkenyl groups include especially solid resins soluble in solvents or liquid resin, that preferably consist of trialkylsiloxy (M units) and silicate units (Q units) and that preferably contain vinyl dimethylsiloxy units in a quantity such that a content of vinyl groups of at least 2 mmol/g results. These resins can additionally have up to maximum 10 mol-% alkoxy or OH groups to the Si atoms.

The component b) of the addition cross-linking silicone-rubber blend according to the invention represents at least one organohydrogen siloxane, each with at least 2 SiH units per molecule, with the criteria that i) at least one of the organohydrogen siloxanes has a content of more than 7 mmol SiH/g, ii) at least one of the organohydrogen siloxanes has at least one aromatic group in the molecule, and iii) the characteristics i) and ii) can be implemented in the same organohydrogen siloxane or in different organodihydrogen siloxanes.

According to this, it is important for the addition cross-linking silicone-rubber blend according to the invention that it contains at least one organohydrogensiloxane with a content of more than 7 mmol SiH/g and at least one organohydrogen siloxane with at least one aromatic group in the molecule. These characteristics can be implemented, e.g. in such a way that the addition cross-linking silicone-rubber blend according to the invention contains an organohydrogen siloxane with a content of more than 7 mmol SiH/g and at least one aromatic group in the molecule or two different organohydrogen siloxanes of which one has an SiH content of more than 7 mmol/g and no aromatic group in the molecule and the other has an aromatic group in the molecule and an optional Si—H content, whereby in each case optionally other organohydrogen siloxanes can be present in addition to the named important organohydrogen siloxanes.

The organohydrogen siloxanes selected according to component b) are preferably selected from linear, branched or cyclic polysiloxanes that can have the following siloxy units:

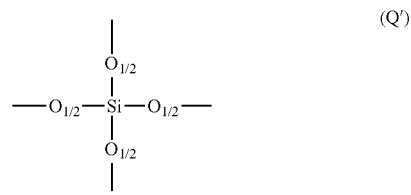

-continued

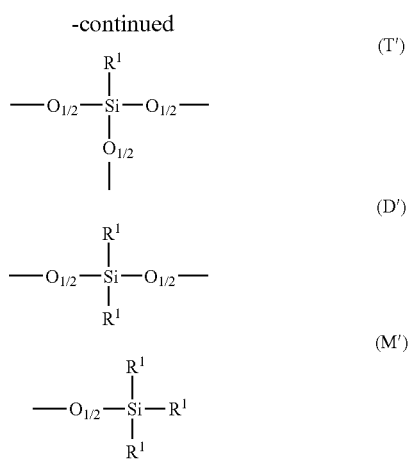

wherein R¹ can be the same or different and selected from the group that consists of
  hydrogen,
  a straight-chain, branched or cyclic alkyl radical with up to 12 carbon atoms, which may be substituted with an aromatic group,
  a straight-chain, branched or cyclic alkenyl radical with up to 12 carbon atoms,
  hydroxyl,
  an aromatic group and
  a straight-chain, branched or cyclic alkoxy radical with up to 6 carbon atoms or two groups R¹ from different siloxy units together form a straight-chain, branched or cyclic alkandiyl radical with 2 to 12 carbon atoms between two silicon atoms, or two substituents R¹ of different siloxy units together form a straight-chain, branched or cyclic alkandiyl radical with 2 to 12 carbon atoms between two silicon atoms.

The organohydrogen siloxanes b) are preferably linear, cyclic or branched organopolysiloxanes of at least one of the units Q', T', D' and M', that can preferably contain MeHSiO and/or $Me_2HSiO_{0.5}$ units optionally in addition to other organosiloxy units, preferably dimethylsiloxy units.

With respect to characteristic i), the SiH of this organohydrogen siloxane is limited to >7 mmol SiH/g, preferably it lies at 10-16.7 mmol/g. These siloxane polymers can also represent branched polysiloxanes, as defined above, i.e. solids that melt below 90° C. and/or solvents that are soluble in the usual solvents or siloxane polymers, These siloxanes are preferably liquid at room temperature and/or soluble in siloxane, i.e. they preferably have less than 1000 siloxy units. The chain length for chains of these siloxanes predominantly consisting of MeHSiO units is preferably 3 to 200, especially preferably 15 to 60.

The SiH content here is determined using ¹H-NMR, see A. L. Smith (Ed.): The Analytical Chemistry of Silicones, J. Wiley & Sons, 1991, Vol. 112, p. 356 ff. in Chemical Analysis, ed. by J. D. Winefordner.

With respect to characteristic ii), the aromatic group may be substituted. Optionally, one to three substituents can be selected, e.g. from alkyl, alkoxy, alkylene, alkylenoxy and halogen. In order to fulfill characteristic ii), the aromatic group can be bound directly to a silicon atom or be present as a substituent of an alkyl group that is bound to a silicon atom. Preferred aromatic units used as substituent R¹ include, e.g.: aromatic units in which the aromatic group is bound directly to a silicon atom, such as phenyl, $C_1$-$C_{10}$ alkyl phenyl, $C_2$-$C_{10}$ alkylene phenyl, $C_1$-$C_{10}$ alkoxyphenyl, $C_2$-$C_{10}$ alkylene oxyphenyl, halogen phenyl and naphthyl and aromatic units, in which the aromatic group is bound to the silicon atom by way of an alkyl group, such as phenyl ($C_1$-$C_{12}$)alkyl. Preferred are aromatic groups, especially phenyl that is bound directly to a silicon atom.

If the radical R¹ contains no aromatic group, it preferably comprises the definition given for R. With respect to other preferred definitions of the organohydrogen siloxanes b) and the possible manufacturing processes, reference can be made to the explanations regarding the components b1), b2) and b3) described below, which apply accordingly for the organohydrogen siloxanes.

The preferred quantity of organohydrogen siloxane b) is 0.2 to 60 weight-parts, related to 100 weight parts of component a).

In a preferred embodiment of the invention, component b) comprises components b1), b2) and optionally component b3), whereby b1) is at least one organohydrogen siloxane with at least two SiH units per molecule and a content of more than 7 mmol SiH/g that contains no aromatic groups, b2) is at least one organohydrogen siloxane with at least two SiH units per molecule and at least one aromatic group is contained in the molecule, and the component that may be present b3) is at least one organohydrogen siloxane with at least two SiH units per molecule and a content of less than 7 mmol SiH/g that contains no aromatic groups.

The organohydrogen siloxane b 1) is preferably a linear, branched or cyclic polysiloxane that can have the following siloxy units:

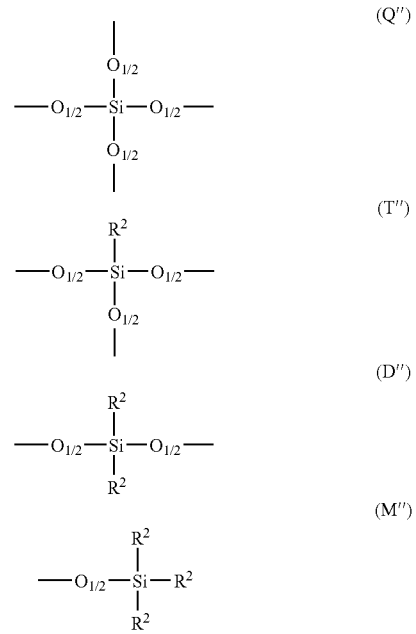

wherein the substituent R² can be the same or different and selected from the group that consists of
  hydrogen,
  a straight-chain, branched or cyclic alkyl radical with up to 12 carbon atoms, which may be substituted with an aromatic group, a straight-chain, branched or cyclic alkenyl radical with up to 12 carbon atoms,
hydroxyl and
a straight-chain, branched or cyclic alkoxy radical with up to 6 carbon atoms, or two substituents $R^1$ of different siloxy units together form a straight-chain, branched or cyclic alkandiyl radical with 2 to 12 carbon atoms between two silicon atoms.

If the radical $R^2$ contains no aromatic group, it preferably comprises the definition named for R, with the criterion that the SiH content is more than 7 mmol/g.

The organohydrogen siloxanes b1) in the sense of the invention are preferably linear, cyclic or branched organopolysiloxane from at least one of the units Q'', T'', D'', M'', the majority (more than 50 mol-%) of which can contain MeHSiO and/or $Me_2HSiO_{0.5}$ units in addition to other organosiloxy units, preferably dimethylsiloxy units. The SiH content of these organohydrogen siloxanes is limited to >7 mmol SiH/g, preferably it lies at 10-16.7 mmol/g. These siloxanes are preferably liquid at room temperature and/or soluble in siloxane, i.e. they preferably have less than 1000 siloxy units. The number of MeHSiO units is preferably 3 to 200, especially preferably 15 to 60.

Preferred embodiments of the organohydrogen siloxanes b1) include linear or cyclic organohydrogen siloxanes of the following formulas:

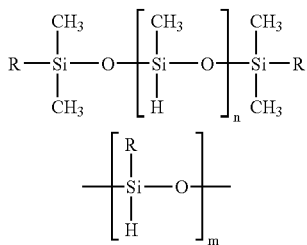

wherein n=1 to 1000 and m=3 to 10

In an especially preferred embodiment, the organohydrogen siloxanes b1) can also be $[(Me_2HSiO_{0.5})_4\ OSiO]$ or $[(Me_2HSiO_{0.5})_{0.2-4}\ OSiO]_{1-500}$.

The organohydrogen siloxanes b1) can be manufactured according to a known process, e.g. acid equilibration or condensation (as described e.g. in U.S. Pat. No. 5,536,803, column line 43-58).

The organohydrogen siloxanes b1) can also be reaction products that are obtained from a hydrosilylation of organohydrogen siloxanes with siloxanes containing alkenyl groups, in the presence of catalysts c), whereby the resulting SiH content must remain within the limit defined above of more than 7 mmol/g. Alkandiyl group-bridged organohydrogen siloxanes result from this.

The organohydrogen siloxanes b1) can also be reaction products that lead to the structures described in U.S. Pat. No. 4,082,726, e.g. columns 5 and 6 from the condensation of e.g. organohydrogen alkoxy siloxanes with the component d), whereby the resulting SiH content must remain within the limit defined above of more than 7 mmol/g.

The preferred quantity of organohydrogen siloxanes b1) is 0.1 to 10 weight-parts, related to 100 weight parts of component a).

The organohydrogen siloxanes b2) are preferably linear, cyclic or branched organopolysiloxane from at least one of the units Q''', T''', D''', M''', the majority (more than 50 mol-%) of which have no SiH groups, as represented by MeHSiO and/or $Me_2HSiO_{0.5}$ unit. In addition to other organosiloxy units, these preferably contain dimethylsiloxy, trimethylsiloxy, methylsiloxy, silicate, diphenylsiloxy, phenylmethylsiloxy or vinylmethylsiloxy units. The SiH content of this organohydrogen siloxanes is limited to <7 mmol SiH/g:

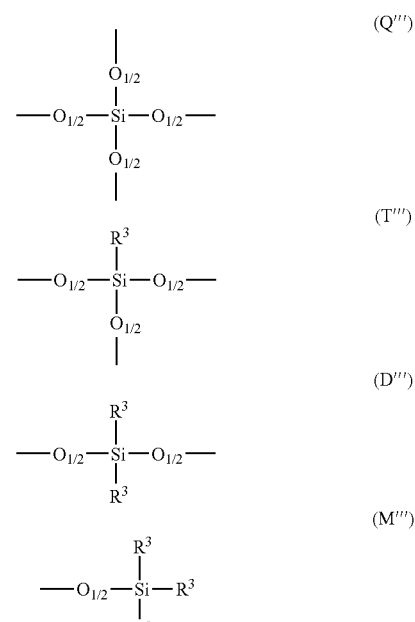

The substituents $R^3$ of the organohydrogen siloxanes b2) can be the same or different and selected from the group that consists of
hydrogen,
a straight-chain, branched or cyclic alkyl radical with up to 12 carbon atoms, which may be substituted with an aromatic group,
a straight-chain, branched or cyclic alkenyl radical with up to 12 carbon atoms or its epoxidated derivative,
an aromatic group
hydroxyl and
a straight-chain, branched or cyclic alkoxy radical with up to 5 carbon atoms, or two $R^3$ groups of different siloxy units together form a straight-chain, branched or cyclic alkandiyl radical with 2 to 12 carbon atoms between two silicon atoms with the criterion that the organohydrogen siloxane b2) has at least one aromatic group in the molecule.

The aromatic group may be substituted. Optionally, preferably one to three substituents can be selected, e.g. from alkyl, alkoxy, alkylene, alkyenoxy, each with up to 12 carbon atoms, and halogen, preferably fluorine. The aromatic group can be bound directly to a silicon atom or be present as a substituent of an alkyl group that is bound to a silicon atom. Preferred aromatic units as substituent $R^3$ include, e.g.: aromatic units in which the aromatic group is bound directly to a silicon atom, such as phenyl, $C_1$-$C_{10}$ alkyl phenyl, $C_2$-$C_{10}$ alkylene phenyl, $C_1$-$C_{10}$ alkoxyphenyl, $C_2$-$C_{10}$ alkylene oxyphenyl, halogen phenyl and naphthyl and aromatic units, in which the aromatic group is bound to the silicon atom by way of an alkyl group, such as phenyl $(C_1$-$C_{12})$alkyl. Preferred is phenyl that is bound directly to a silicon atom.

If the radical $R^3$ contains no aromatic group, it preferably comprises the definition named for R.

The siloxy units can be distributed statically or be present arranged in blocks in optional sequence.

The organohydrogen siloxanes b2) effectively have a viscosity from 1 to 50,000 mPa·s at 20° C., preferably the viscosity is 10-5000 mPa·s and/or they are solids that melt below 90° C. with melting viscosities in this range or solids that are soluble in the usual solvents or siloxane polymers, The arylsiloxy units are preferably diarylsiloxy, methylarylsiloxy or tri-functional arylsiloxy units, especially preferred are diphenylsiloxy and 2-phenyethylene methylsiloxy/(styryl)(methyl)siloxy units.

The content of aromatic groups is effectively 1 to 67 mol-%, preferably 2-20 mol-%, especially preferably 2-11.8 mol-% related to the organic radicals bound to the Si, whereby SiH is not counted as an organic group.

Besides that, MeHSiO and/or $Me_2HSiO_{0.5}$ units, in addition to other organosiloxy units, preferably dimethylsiloxy units, are present.

The SiH content is effectively about 0.1-16.7 mmol SiH/g and preferably 3-15 mmol SiH/g.

For economic reasons, the percentage of aromatic siloxy units will be minimized and those units selected that can be obtained cost-effectively.

The organohydrogen siloxanes b2) can be produced according to a known process (e.g. acid equilibration and/or condensation of linear or cyclic siloxanes, as described in U.S. Pat. No. 5,536,803 that contain the corresponding organosiloxy units separately or by cohydrolysis of appropriate organochlorosilane and subsequent acid equilibration and/or condensation).

The preferred quantity of organohydrogen siloxane b2) is 0.1 to 20 weight-parts, related to 100 weight parts of component a).

The organohydrogen siloxanes b3) in the sense of the invention are organohydrogen siloxanes according to the definition above of component b1) with the criterion that they have a content of less than 7 mmol SiH/g, but at least 2 SiH units per molecule. The organohydrogen siloxanes b3) are optionally used. They are especially used if the rubber mechanical properties such as tear propagation resistance or aging characteristics such as stability in hot air have to be optimized.

The characteristic of b3) is an SiH content that is under 7 mmol SiH/g, preferably 0.2-6.9 mmol/g. In the case of organohydrogen siloxanes b3), the number of siloxy units is 3 to 1000, but preferably 10 to 200 and more preferably 20-50.

The siloxy units in b3) are preferably adjusted in such a way that liquid and/or siloxane-soluble hydrogen siloxanes with a viscosity of 0.5-50,000 mPa·s at 20° C. result. Siloxanes b3) also comprise the solids that melt under 90° C. with melt viscosities in this range or solids that are soluble in the usual solvents or siloxane polymers.

The preferred representatives are trimethyl and/or hydrogendimethylsiloxy end stopped polymethyl hydrogen diorganosiloxane.

As described for b1), reaction products produced by hydrosilylation with a) or reaction products produced by condensation with a) or d) can be used.

The manufacturing of organohydrogen siloxane b3) occurs in a known way, for example, in U.S. Pat. No. 5,536,803, whereby the SiH content is adjusted by the selection of suitable weight ratios of the hydrogen organosiloxy to the organosiloxy units.

The preferred quantity of the organohydrogen siloxanes b3) is 0 to 30 weight parts, related to 100 weight parts of component a).

The addition cross-linking silicone-rubber blend according to the invention contains c) at least one Pt, Ru and/or Rh catalyst for the cross-linking reaction and/or hydrosilylation. Platinum catalysts are preferred. Especially preferred catalysts c) are preferably Pt(0) complexes, Pt (II) complexes or salts thereof or Pt(IV) complexes or salts thereof with ligands like alkenyl siloxanes, cycloalkyl dienes, alkenes, halogen and/or pseudohalogen, carboxyl, ligands containing S, N or P groups as complexing agents in catalytic quantities of 1 to 1000 ppm, preferably 1-100 ppm, especially preferably 1-20 ppm, related to metal. Ru and/or Rh catalysts include e.g.: Rh or Ru complexes and/or salts, like Di-μ,μ'-dichloro-di(1, 5-cyclooctadiene)dirhodium. The compounds described in *J. Appl. Polym. Sci* 30, 1837-1846 (1985) can be used as Rh compounds.

The addition cross-linking silicone-rubber blend according to the invention optionally contains at least one inhibitor. Inhibitors in the sense of the invention are all commercial compounds that have been used to date for delaying and/or inhibiting the hydrosilylation. Examples of such preferred inhibitors are vinyl methylsiloxane, e.g. 1,3-Divinyl-tetramethyl disiloxane, 1,3,5,7-tetravinyl-1,3,5,7-tetramethyl cyclotetrasiloxane, alkinols like 20 methylbutinol-(2) or 1-ethinyl cyclohexanol U.S. Pat. No. 3,445,420 in quantities of 50 to 10,000 ppm and all other known inhibitors containing S, N and/or P (DE-A 36 35 236) that make it possible to delay the hydrosilylation caused by the reaction of the pure Pt, Ru or Rh catalysts of component c).

The addition cross-linking silicone-rubber blend according to the invention also contains at least one alkoxysilane and/or alkoxysiloxane d) that has at least one epoxy group. The epoxy group is effectively an epoxy group bound via an alkandiyl group to Si (epoxy-(CH2)x-Si). Preferred are those that have a maximum of 5 C atoms in the alkoxy function and that usually have 2, but preferably 3, alkoxy groups per molecule. This includes epoxy silanes and epoxy siloxanes as described in EP 691 364.

The alkoxysilanes d) also comprise glycidoxypropyl trialkoxysilane and dialkoxysilane or 2-(3,4-epoxycyclohexyl)ethyltrialkoxysilane, epoxyimonyltrialkoxysilane, epoxidated norbornenylethyl trialkoxysilane and/or ethylidene norbornyl trialkoxysilane and other $C_3$ to $C_{14}$ epoxidated alkenyl and/or alkenylaryl trialkoxysilanes, epoxidated trisalkoxysilyl propylallyl cyanurate and/or isocyanurates, as well as their dialkoxy derivatives, acryloxy propyl trialkoxysilane and/or methacryloxy propyl trialkoxysilane and their condensation products after reaction with water, alcohols or silanols and/or siloxane diols.

Preferred are mono(epoxyorgano)trialkoxy silane, e.g. glycidoxypropyltrimethoxysilane,2-(3,4-epoxycyclohexyl) ethyltrialkoxysilane or methacryloxypropyl trimethoxysilane and/or their siloxanes, especially preferred are mixtures of glycidoxypropyltrimethoxysilane and methacryloxypropyltrimethoxysilane in quantities of 0.01 to 10 parts, related to 100 parts of component a) and/or about 0.002 to 9.1 weight-%, related to the total quantity of the addition cross-linking silicone-rubber blend.

Reaction products of d) with a) and b) produced by hydrosilylation, as described for component b1) and/or reaction products of d) with b) produced by condensation can also be used.

The addition cross-linking silicone-rubber blend according to the invention also optionally contains one or more, optionally surface-modified, filler (f). These include, e.g.: all finely-distributed fillers, i.e. with particles less than 100 μm that do not interfere with the Pt-catalyzed cross linking reaction so that elastomer coatings, molded parts or extrudates can be produced.

This may be mineral fillers like silicates, carbonates, nitrides, oxides, soot or silicic acid. Preferably this involves those fillers that reinforce rubber-mechanical characteristics, e.g. pyrogenic or precipitated silicic acid with BET surfaces between 50 and 400 m$^2$/g that can also be surface treated, in quantities of 0 to 300 weight parts, preferably 10 to 50 parts, related to 100 weight parts of component a).

Fillers with BET surfaces over 50 m$^2$/g make possible the manufacturing of silicone elastomers with improved rubber mechanical properties. Rubber mechanical strength and the transparency increase with e.g. pyrogenic silicic acids such as Aerosil, HDK, Cab-O-Sil, with their surface.

Besides that, so-called extender fillers like quartz powder, diatomaceous earth, cristobalite powder, mica, aluminum oxides, Ti, Fe, Zn oxides, chalk or soot with BET surfaces of 1-50 m$^2$/g can be used additionally or as a substitute.

The term filler f) means the fillers, including their hydrophobitizing agent and/or dispersing agents and/or process aids bound on their surfaces that influence the interaction of the filler with the polymer, e.g. the thickening effect. The surface treatment of fillers preferably involves a hydrophobitizing with silanes or siloxanes, such as hexamethyl silazane and/or divinyl tetramethyldisilazane and water, the "in-situ" hydrophobitizing is preferred. It can also be carried out with other commercial filler treating agents like vinylalkoxy silanes, e.g. vinyl trimethoxysilane, organosiloxane diols with chain lengths of 2-50 in order to produce reactive sites for the cross linking reaction, as well as with fatty acid or fatty alcohol derivatives.

The addition cross-linking silicone-rubber blend according to the invention also optionally contains at least one additive (g), e.g. phenylsiloxane oils that supply self-lubricating vulcanisates, e.g. copolymers of dimethylsiloxy and diphenylsiloxy or methylphenylsiloxy groups, as well as polysiloxanes with methylphenylsiloxy groups having a viscosity of preferably 0.1-10 Pas or dyes and/or colored pigments as colored pastes, additionally mold parting compounds such as fatty acid or fatty alcohol derivatives, extrusion additives such as boric acid or PTFE pastes, biocides like fungicides, hot air stabilizers such as Fe, Ti, Ce, Ni, Co compounds. The quantity of additives is preferably 0 to 15 weight parts, related to 100 weight parts of component a) and preferably below 13 weight-% related to the total quantity of the rubber blend.

Another object of the invention is a process for manufacturing the addition cross-linking silicone-rubber blend, which comprises the mixing of components a) to d) and optionally components e) to g).

The mixture is preferably carried out with mixers suitable for high-viscosity pastes, e.g. kneaders, dissolvers or planetary mixers under inert gas atmospheres.

In a preferred embodiment, the so-called reinforcing fillers are mixed, i.e. those with BET surfaces above 50 m$^2$/g, in such a way that they are hydrophobized/become hydrophobic 'in-situ' during the mixing process.

In this case, preferably the organopolysiloxanes a), fillers and the hydrophobization agent, preferably hexamethyldiliazane and/or divinyl tetramethyldisilazane are stirred with water in the presence of silicic acids component f), preferably at temperatures of 90 to 100° C. for at least 20 minutes in a mixing system suitable for high-viscosity materials, e.g. a kneader dissolver or planetary mixer and then are freed from excess hydrophobization agents and water at 150 to 160°, first by evaporation at normal pressure and then in a vacuum at a pressure of 100 to 20 mbar. The other components are then effectively mixed in over 10 to 30 minutes.

In a preferred embodiment of the process for manufacturing the addition cross-linking silicone-rubber blend, first the manufacturing of a partial mixture is carried out that contains more than one, but not all, of components a) to g).

This division into partial mixtures serves for better handling of the reactive mixing of the components a) to d) and optionally e) to g). In particular, the components b1), b2) and b3) should be preferably stored separately from catalyst c). Component d) and the inhibitor e) can more or less advantageously be supplied in each of the components, as long as the components a), b) and c) that react with each other are not present at the same time.

In a preferred embodiment of the method according to the invention for manufacturing the addition cross-linking silicone-rubber blend, first an initial partial mixture is produced by combination of
  at least one organopolysiloxane a)
  optionally at least one filler f)
  optionally at least one additive g),
  at least one catalyst c) and
  optionally at least one alkoxysilane and/or alkoxysiloxane d), a second partial mixture is produced by combination of
  optionally an organopolysiloxane a),
  at least one organohydrogen siloxane b1),
  at least one organohydrogen polysiloxane b2),
  optionally at least one organosiloxane b3), optionally at least one filler f),
  optionally at least one alkoxysilane and/or alkoxysiloxane d),
  optionally at least one inhibitor e) and
  optionally at least one additive g), and the two partial mixtures are then mixed. In another preferred embodiment of the process according to the invention for manufacturing the addition cross-linking silicone-rubber blend, first a first partial mixture is produced by combination of
  at least one organopolysiloxane a),
  optionally at least one filler f),
  optionally at least one additive g),
  at least one catalyst c) and
  optionally at least one alkoxysilane and/or alkoxysiloxane d) are included as long as these are not contained in the second or third partial mixture, a second partial mixture is produced by combination of
  at least one organohydrogen siloxane b1),
  optionally at least one organopolysiloxane a),
  optionally at least one organohydrogen siloxane b2) containing an aromatic group, as long as it is not contained in the third partial mixture,
  optionally at least one organosiloxane b3),
  optionally at least one filler f),
  optionally at least one alkoxysilane and/or alkoxysiloxane d) as long as they are not contained in the first or third partial mixture,
  optionally at least one inhibitor e) and
  optionally at least one additive g)

a third partial mixture is produced by combination of
  at least one organohydrogen siloxane b2) containing an aromatic group and/or
  at least one alkoxysilane and/or alkoxysiloxane d), in each case as long as the components b2) and/or d) are not included in the first or second partial mixture, optionally at least one organohydrogen siloxane b1), as long as it is not included in the second partial mixture,
optionally at least one organohydrogen siloxane b3) as long as it is not included in the second partial mixture,
optionally at least one organopolysiloxane a),
optionally at least one filler f) and
optionally at least one additive g)

and the three partial mixtures are then mixed together.

The terms "partial mixture" and/or "reactive component" also include the case in which the partial mixture contains only one component.

Another object of the invention is addition cross-linking silicone-rubber blends that are obtained by cross linking and/or vulcanizing of the addition cross-linking silicone-rubber blend according to the invention. The cross linking and/or vulcanizing is carried out in a temperature range from 0 to 300° C., depending on the reactivity of the addition cross-linking silicone-rubber blends.

Cross linking can be carried out under normal pressure, vacuum to 20 mbar or excess pressure, in the presence of ambient air. Excess pressure in the presence of ambient air includes injection molding and cross linking on a substrate surface under injection conditions, i.e. up to 300 bar related to the weight per surface area of the molded part.

The addition cross-linking silicone-rubber blends generally involve elastomeric molded parts.

Another object of the invention is a process for manufacturing composite molded parts, characterized in that at least one of the addition cross-linking silicone-rubber blends according to the invention is cross linked on a mineral, metallic, duroplastic and/or thermoplastic substrate.

A preferred substrate is a thermoplastic substrate, especially preferred is the substrate of polybutylene terephthalate, polyamide or polyphenylene sulfide.

In a preferred embodiment of the process according to the invention for manufacturing the composite molded parts, the addition cross-linking silicone-rubber blend according to the invention is applied to the surface of a previously manufactured thermoplastic molded part, optionally with coating, casting, calenderizing, applied with a blade and rolling, preferably at normal pressure, then cross linked at temperatures of 0 to 300° C., preferably 50 to 250° C. and bonded in this process.

Especially preferably, the manufacturing of the preferred thermoplastic molded parts is carried out immediately before the application of the addition cross-linking silicone-rubber blend.

In another preferred embodiment of the process according to the invention for manufacturing the composite molded parts, the addition cross-linking silicone-rubber blend according to the invention is vulcanized on the surface of a thermoplastic molded part that is preferably spray coated immediately before in an injection molding tool at temperatures of 50 to 300° C. and bonded thereby.

In the processes mentioned above for manufacturing the composite molded part, addition cross-linking silicone-rubber blends are generally placed on the substrate in the vulcanizing space in which the surface of the substrate is found. In this process, the addition cross-linking silicone-rubber blend is preferably manufactured immediately before by mixing components a) to g). Especially preferably, the reactive partial mixtures described above are produced and are then mixed. In this process, the reactive partial mixtures can also be sprayed directly on the substrate to be coated and then cross linked.

The substrates that are coated with the addition cross-linking silicone-rubber blend according to the invention also include e.g.: glass, optionally pretreated metal or preferably, optionally pretreated plastic. As thermoplastic, preferably e.g. polyethylene terephthalate, polybutylene terephthalate, fully aromatic polyester, fluid-crystalline polyester, polycyclohexylene terephthalate, polytrimethylene terephthalate, aliphatic polyamides, polyphthalamide, partially aromatic polyamides, polyphenyl amide, polyamidimide, polyetherimide, polyphenylene oxide, polysulfone, polyether sulfone, aromatic polyetherketone, PMMA, polycarbonate, ABS polymers, fluoropolymers, syndiotactic polystyrene, ethylene carbon monoxide copolymers, polyphenylene sulfone, polyarylene sulfide and polyphenylene sulfoxide. Duroplastic plastics include, e.g.: melamine, urethane, epoxide, phenylene oxide or phenol resins.

During the cross linking and/or vulcanizing process, these substrate surfaces are bonded with at least one of the addition cross-linking and/or cross linked silicone-rubber blends according to the invention.

The silicone-rubber blend divided into two to three reactive partial mixtures is combined before vulcanizing by mixing in an automatic injection molding machine or an upstream mixing head and optionally a subsequent static mixer and then cross linked at 0-300° C. and bonded. Preferably, after mixing, the components are injected into a molding die at elevated temperature of 50-250° C. The mold nest holding the silicone-rubber blend of this tool does not need to be coated or treated with mold parting compounds in order to keep the adhesion on the tool surface adequately low for mold release. Information can be found on the design structuring of molds that preferably follow each other that are coated with a duroplastic or thermoplastic and an elastomer material in Schwarz; Ebeling; Furth: Kunststoffverarbeitung [Plastic Processing], Vogel-Verlag, ISBN: 3-8023-1803-X and in Walter Michaeli: Einführung in die Kunststoffverarbeitung [Introduction to Plastic Processing], Hanser-Verlag, ISBN 3-446-15635-6.

In order to guide the molds and keep them closed, preferably automatic injection molding machines are selected with holding forces of greater than 3000 N/cm$^2$ molded part surface.

All commercial automatic injection molding machines can be used for the process according to the invention. The technical selection is determined by the viscosity of the silicone-rubber blend and the molded part dimensions.

The quantity ratios of the reactive partial mixtures used correspond to those that result after mixture of the silicone-rubber blends decribed according to the invention. They are determined by the desired Si alkenyl to SiH ratio and the necessary quantities of bonding agent constituents of the components b1) to b3).

The object of the invention is also the use of the addition cross-linking silicone-rubber blend according to the invention to produce composite molded parts, e.g. sealing and/or damping bracket elements, handles, keyboards, switches, shower heads, light sockets or other fasteners that simultaneously have a thermoplastic and a silicone-rubber part.

EMBODIMENT EXAMPLES

Example 1 (According to the Invention)

Production of a basic mixture BM1 and a first reactive "partial mixture" of the reactive component (Ia):

In a dissolver, 19 parts dimethylvinylsiloxy end stopped polydimethyl siloxane a1) with a viscosity of 10 Pa·s and 35 parts dimethylvinylsiloxy end stopped polydimethylsiloxane a2) with a viscosity of 65 Pa·s ware mixed with 5.1 parts hexamethyldisilazane and 1.8 parts water, then mixed with 23.5 parts pyrogenic silicic acid f) with a BET surface of 300 $m^2/g$ (Aerosil 300® Degussa), heated to approx. 100° C., stirred approx. 1 h and after that freed of water and excess residues of the hydrophobitizing agent at 150 to 160° C. (finally in a vacuum at p=20 mbar) and then diluted with 19 parts a1) and 0.5 parts of a dimethylvinylsiloxy end stopped polydimethyl siloxane a3) with methylvinylsiloxy groups with a vinyl content of 2 mmol/g and a viscosity of 0.2 Pa·s. A basic mixture BM1 is obtained.

After cooling, approx. 100 parts of the basic mixture BM1 were mixed with 0.0135 parts of a Pt complexing compound c) with alkenyl siloxane as ligands in tetramethyltetravinyl cyclotetrasiloxane (Pt content: 15 weight-%). The mixture components combined to this point are named reactive component Ia in the following examples.

Production of a second basic mixture BM2 and a second reactive component Ib: In a dissolver, 20 parts dimethylvinylsiloxy end stopped polydimethyl siloxane a1) with a viscosity of 10 Pa·s and 36 parts dimethylvinylsiloxy end stopped polydimethyl siloxane a2) with a viscosity of 65 Pa·s are mixed with 5.2 parts hexamethyl disilazane and 1.9 parts water, then with 24 parts pyrogenic silicic acid f) with a BET surface of 300 $m^2/g$, heated to approx. 100° C., stirred approx. 1 h and after that freed of water and excess waterproofing compound residues at 150 to 160° C. (finally at a vacuum at p=20 mbar) and then diluted with 13 parts a1). The mixture obtained is designated as basic mixture BM2.

After cooling, 1 part of trimethylsilyl end stopped methylhydrogen siloxane b1) with an average SiH content of 15 mmol/g and an average content of 30 MeHSiO groups per molecule of component b1), with 1.9 parts of a trimethylsilyl end stopped diphenyl methylhydrogen dimethyl polysiloxane b2) $M_2D_7D^H_6D^{phe2}_{0.9}$ with an average SiH content of 4.9 mmol/g and an average Si-phenyl content of 1.5 mmol/g 6.5 mol-% produced from an anionic equilibration with 1.4 parts glycidyloxypropyl trimethoxysilane as component d) and mixed with 0.1 parts ethylnylcyclohexanol as inhibitor e) is mixed with 96 parts of basic mixture BM2. The reactive component Ib is obtained.

The mixture of Ia and Iab of the compound according to the invention in a weight ratio of 0.96:1 is vulcanized on the thermoplastic parts placed in a vulcanizing mold under the conditions specified in Table 1. Outstanding bonding results are obtained with all thermoplastics tested.

Example 2 (According to the Invention)

Production of the reactive component IIb. The production of the basic mixture BM3 is carried out in the same way as basic mixture BM2 in example 1 with the following deviation that makes it possible to largely compensate for the density differences due to the different amounts of additive, with reactive component Ia remaining the same.

However, as a deviation from basic mixture BM1 in example 1, the basic mixture BM3 contains 19 parts dimethylvinylsiloxy end stopped polydimethylsiloxane a1) with a viscosity of 10 Pa·s, 35 parts dimethylvinylsiloxy end stopped polydimethyl siloxane a2) with a viscosity of 65 Pa·s and 23.5 parts pyrogenic silicic acid f) with a BET surface of 300 $m^2/g$. Then this mixture is diluted with 13 parts a1) as in example 1. After cooling, 93.6 parts of basic mixture BM3 was mixed with 1 part of an organohydrogen siloxane b1) as in example 1 with an average SiH content of 15 mmol/g and an average content of 30 SiH groups per molecule with 1.9 parts of an organohydrogen siloxane b2) with an average SiH content of 4.9 mmol/g and an average Si-phenyl content of 1.5 mmol/g as in example 1, with 1.4 parts gylcidyloxypropyl trimethoxysilane with 1.7 parts methacryloxypropyl trimethoxysilane and 0.1 parts ethinylcyclohexanol as inhibitor. Reactive component IIb is obtained.

The reactive components Ia and IIb were mixed in a ratio of 0.93:1 and vulcanized on the thermoplastics as in example 1.

The example shows the influence of the use of an additional alkoxysilane in component d).

Example 3 (Comparison Example)

Production of the basic mixture BM2 as in example 1:

After cooling, 96 parts of the basic mixture BM2 were mixed with 1 part of an organohydrogen siloxane b3), 1.9 parts of an organohydrogen siloxane b2) as in example 1 were mixed with 1.7 parts methacryloxypropyl trimethoxysilane d) and with 0.1 parts ethinylcyclohexanol as inhibitor e). Reactive component IIIb is thus obtained.

Reactive components Ia and IIIb are mixed in a 0.95:1 ratio as in example 1 and vulcanized.

Example 3 shows that leaving out the epoxy-containing component d) has a negative effect on adhesion.

Example 4 (Comparison Example)

Production of basic mixture BM3 as in example 2:

After cooling of 93.6 parts of the remaining basic mixture BM3 was mixed with 2.0 parts of a trimethylsiloxy end stopped methylhydrogen dimethylsiloxane b3) having an average SiH content of 7.3 mmol/g and an average number of 20 SiH groups per molecule were mixed with 1.8 parts of an organohydrogen siloxane b2) from example 1 with 1.4 parts gylcidyloxypropyl trimethoxysilane, with 1.7 parts methacryloxypropyl trimethoxysilane d) and with 0.1 parts ethinyl cyclohexanol as inhibitor e). The reactive component IVb is obtained.

The reactive components Ia and IVd were mixed in a 0.95:1 ratio as above and vulcanized on the thermoplastic.

Example 4 shows that the component b3) in place of b1) supplies less good adhesion results than component b1).

Example 5 (Comparison Example)

Production of reactive component Vb. The production of the basic mixture BM2 is carried out as in example 1:

After degasifying and cooling, 96 parts of the remaining basic mixture BM2 is mixed with 1.7 parts of an organohydrogen polysiloxane b1) with an average SiH content of 15 mmol/g as in example 1, with 1.4 parts gycidyloxypropyl trimethoxysilane, with 1.7 parts methacryloxypropyl trimethoxysilane d) and with 0.1 parts ethinylcyclohexanol as inhibitor e).

The reactive component Vb is obtained. Reactive components Ia and Vb are mixed in a ratio of 0.95:1 as above and vulcanized on the thermoplastics named.

Example 5 shows that leaving out the phenyl-containing SiH component b2) has a negative effect on adhesion.

Example 6 (Comparison Example)

Production of reactive component VIb. The production of the basic mixture BM2 is carried out as in example 1. After cooling, 96 parts of basic mixture BM2 are mixed with 1 part of an organohydrogen polysiloxane b1) with an average SiH content of 15 mmol/g as in example 1, with 1.9 parts of an organohydrogen polysiloxane b2) with an average SiH content of 5 mmol/g and an average Si-phenyl content of 1.5 mmol1 g as in example 1 and with 0.1 parts ethinylcyclohexanol as inhibitor e).

Reactive component VIb is obtained. The reactive components Ia and VIb were mixed in a ratio of 0.97:1 as above and vulcanized on the named thermoplastics. Example 6 shows that leaving out component d) has a negative effect on adhesion.

Producing and Evaluating the Composite Parts

The molding die was heatable up to 300° C. the silicone-rubber blends according to the invention can actually be processed up to these temperatures and vulcanized, however the molded parts according to the invention are preferably vulcanized on the thermoplastic surface at temperatures of more than 15° C. below the Vicat heat distortion temperature (HDT) of the respective thermoplastics, this range is about 110 to 210° C.

For production of the composite molded parts, the two reactive components (I+II) of the silicone-rubber are each supplied to the molding die in a 2-component metering system by way of a mixing head with static mixer connected through an automatic injection molding machine under pressure at 25-100° C. in a ratio of 1:1. The molding nest in the die was designed for a plate of dimensions 100×30×6 mm that can be reduced by a slider. In one of the embodiments of production of the composite material, first the respective thermoplastic, at 80-350° C. according to the criterion of its respective heat distortion temperature was injected using a second automatic injection molding machine and a separately, optionally cooled, injection duct and a mold nest of 100×30×3 mm reduced by the slider. After cooling for 20 sec to more than 15° C. below the Vic at heat distortion temperature, the silicone-rubber blend is then injected into the opening of the complete mold nest of 100×30×6 mm released by the opening of the slider.

In a second embodiment, a thermoplastic molded part of approx. 3 mm thickness is placed in the mold nest of the heated mold.

The test specimens evaluated in Table 1 were produced according to this process. In this case, the mold temperature lay at least 15° C. below the Vicat heat distortion temperature for the respective thermoplastic material. For example, the hardening of the silicone-rubber on polyamide 6.6 (PA 6.6), polyamide 6 (PA 6), polybutylene terephthalate (PBT) at die temperatures of 140-155° C. or with polyphenylene sulfide (PPS) at die temperatures of 140-210° C. The holding pressure for this molding die is 35 t. The hardening times for the silicone-rubber was in the range 10-100 sec here.

The Vicat heat distortion temperature is measured as 180-190° C. at 1.8 Mpa according to ISO 75, Parts 1 and 2 for PBT Celenax:HDT/A, that of PPS Fortron HDT/A is measured as 270° C. at 1.8 MPa according to ISO 75, Parts 1 and 2.

The molds used in the examples for production of the composite molded parts were steel molds with polished surface of steel quality 1.2343. The adhesion of the hardened silicone-rubber blends on various substrates was tested on the basis of DIN 53 289 (floating roller peel test) with at least 3 test specimens in each case with a pulling speed of 100 mm/min 24 hours after production without supplying an additional heat treatment to the test specimens. The results of the floating roller peel tests are summarized in Table 1.

Table 1 shows that the respective formulations of examples 1 to 6 can exhibit more or less great advantages and disadvantages in adhesion, depending on the substrate. High adhesion values without failures could be achieved on all substrates with the silicone-rubber blends according to the invention. Table 1 shows the overall evaluation for the total of individual adhesion in [N/mm].

TABLE 1

| Substrate | Example 1 [N/mm] | Example 2 [N/mm] | Example 3 [N/mm] | Example 4 [N/mm] | Example 5 [N/mm] | Example 6 [N/mm] |
| --- | --- | --- | --- | --- | --- | --- |
| PA 6.6 | 2.9 | 2.7 | 1.9 | 1.7 | 1.7 | 1.3 |
| PA 6 | 2.5 | 2.3 | 0.4 | 1.2 | 1.4 | 1.6 |
| PBT | 2.9 | 3.5 | 3.3 | 2.4 | 3.4 | 1.9 |
| PPS | 1.7 | 1.8 | 1.6 | 1.7 | 1.6 | 1.7 |
| Total | 10 | 10.3 | 7.2 | 7 | 6.5 | 6.5 |

The invention claimed is:

1. Addition cross-linking silicone-rubber blend comprising:
    a) at least one linear or branched organopolysiloxane having at least two alkenyl groups with a viscosity of 0.01 to 30,000 Pa·s,
    b1) at least one organohydrogen siloxane having 30 to 200 MeHSiO units per molecule and a content of more than 7 mmol SiH/g that contains no aromatic groups,
    b2) at least one organohydrogen siloxane with at least two SiH units per molecule and at least one aromatic group is contained in the molecule,
    whereby the characteristics b1) and b2) are implemented in different organohydrogen siloxanes,
    c) at least one Pt, Ru and/or Rh catalyst,
    d) at least one alkoxysilane or at least one alkoxysiloxane, or at least one of each, each of which has at least one epoxy group,
    e) optionally at least one inhibitor,
    f). optionally at least one filler, optionally surface-modified, and
    g) optionally at least one additive,
    whereby the molar ratio of the entire quantity of the SiH groups to the total quantity of Si-bound alkenyl groups of all components in the mixture is at least 0.7.

2. Addition cross-linking silicone-rubber blend according to claim 1, wherein the alkoxysilanes according to component d) is 2-(3,4-epoxycyclo-hexyl)ethyltrialkoxysilane.

3. Process for manufacturing the addition cross-linking silicone-rubber blend of claim 1, which comprises mixing components a) to d) and optionally components e) to g).

4. Process according to claim 3, further comprising the preparation of at least one partial mixture that comprises more than one, but not all, of the components a) to g).

5. Process according to claim 4, wherein a first partial mixture is produced by combination of
    at least one organopolysiloxane a),
    optionally at least one filler f),
    optionally at least one additive g),
    at least one catalyst c) and optionally at least one alkoxysilane or at least alkoxysiloxane d) or at least one of each a second partial mixture is produced by combination of
optionally an organopolysiloxane a),
at least one organohydrogen siloxane b1),
at least one organo hydrogen siloxane b2),
optionally at least one filler f),
optionally at least one alkoxysilane or at least one alkoxysiloxane d), or at least one of each
optionally at least one inhibitor e) and
optionally at least one additive g)
and the two partial mixtures are then mixed.

6. Process according to claim 4, wherein a first partial mixture is produced by combination of
at least one organopolysiloxane a),
optionally at least one filler f),
optionally at least one additive g),
at least one catalyst c) and
optionally at least one alkoxysilane or at least one alkoxysiloxane d), or at least one of each are included, as long as these are not contained in the second or third partial mixture,
a second partial mixture is produced by combination of
at least one organohydrogen siloxane b1),
optionally at least one organohydrogen siloxane b2) containing an aromatic group, as long as it is not contained in the third partial mixture,
optionally at least one organopolysiloxane a),
optionally at least one filler f),
optionally at least one alkoxysilane, or at least one alkoxysiloxane d) or at least one of each as long as they are not contained in the first or third partial mixture,
optionally at least one inhibitor e) and
optionally at least one additive g)
a third partial mixture is produced by combination of
at least one organohydrogen siloxane b2) containing an aromatic group and/or at least one alkoxysilane or at least one alkoxysiloxane d), or any combination thereof in each case as long as the components b2) and/or d) are not included in the first or second partial mixture,
optionally at least one organohydrogen siloxane b1), as long as it is not included in the second partial mixture,
optionally at least one organopolysiloxane a),
optionally at least one filler f) and
optionally at least one additive g)
and the three partial mixtures are then mixed together.

7. Addition cross-linked silicone-rubber blends obtained by cross linking the silicone-rubber blend of claim 1.

8. Composite molded parts of a mineral, metallic, duroplastic or thermoplastic substrate and an addition cross-linked silicone-rubber blend according to claim 7.

9. Composite molded part according to claim 8 wherein said parts comprise sealing damping bracket elements, handles, keyboards, switches, shower heads, lamp sockets or other fasteners.

10. Process for manufacturing composite molded parts, wherein at least one addition cross-linking silicone-rubber blend according to claim 1 is placed on a substrate for cross linking.

11. Process according to claim 10, wherein the substrate is selected from the group consisting of mineral, metallic, duroplastic and thermoplastic substrates.

12. Process according to claim 10, wherein the silicone rubber mixture is applied to the surface of a previously manufactured thermoplastic molded part, optionally with coating, casting, calenderizing, by application with a blade and rolling, then cross linked at temperatures of 0 to 300° C., and bonded in this process.

13. Process according to claim 10, wherein the silicone-rubber blend is vulcanized on the surface of a duroplastic or thermoplastic molded part previously injected in an injection molding die at temperatures of 50-300° C. and thereby bonded.

14. Process according to claim 10, wherein the thermoplastic material is selected from the group consisting of polybutylene terephthalate, polyamide and polyphenylene sulfide.

15. Addition cross-linking silicone-rubber blend according to claim 1, wherein the organopolysiloxane a) is a linear or branched polysiloxane having siloxy units selected from the group consisting of:

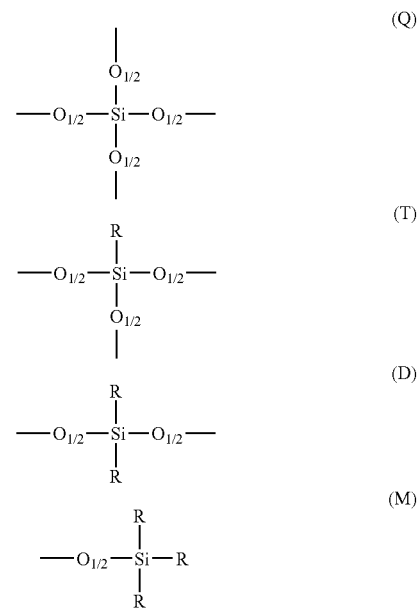

wherein the substituents R are the same or are different and are selected from the group consisting of
straight-chain, branched or cyclic alkyl radicals having up to 12 carbon atoms,
optionally substituted with at least one substituent, selected from the group consisting of phenyl and halogen,
straight-chain, branched or cyclic alkenyl radical radicals having up to 12 carbon atoms,
phenyl radicals,
hydroxyl and
straight-chain, branched or cyclic alkoxy radicals having up to 6 carbon atoms,
or wherein two substituents R from different siloxy units form together a straight-chain, branched or cyclic alkandiyl radical of 2 to 12 carbon atoms between two silicon atoms,
with the provisio that at least two substituents R, which can be the same or different, represent said alkenyl groups per molecule.

16. Addition cross-linking silicone-rubber blend according to claim 15, wherein said substituent of said straight chain, branched or cyclic alkyl radicals is halogen and said halogen is fluorine.

17. Addition cross-linking silicone-rubber blend according to claim 1, wherein the component(s) b) are selected from linear, branched or cyclic polysiloxanes, having siloxy units selected from the group consisting of:

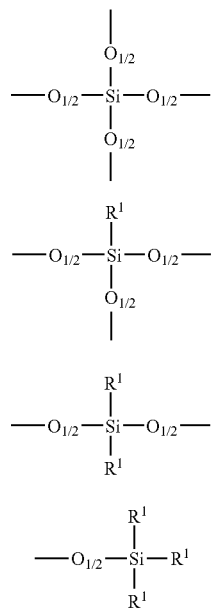

wherein $R^1$ can be the same or different and is selected from the group consisting of hydrogen,
straight-chain, branched or cyclic alkyl radicals having up to 12 carbon atoms, optionally substituted with an aromatic group,
straight-chain, branched or cyclic alkenyl radicals having up to 12 carbon atoms, hydroxyl,
aromatic groups and
straight-chain, branched or cyclic alkoxy radicals having up to 6 carbon atoms or wherein two groups $R^1$ from different siloxy units together form a straight-chain,
branched or cyclic alkandiyl radical of 2 to 12 carbon atoms between two silicon atoms.

18. Addition cross-linking silicone-rubber blend comprising:
 a) at least one linear or branched organopolysiloxane having at least two alkenyl groups with a viscosity of 0.01 to 30,000 Pa·s,
 b1) at least one organohydrogen siloxane having 30 to 200 MeHSiO units per molecule and a content of more than 7 mmol SiH/g that contains no aromatic groups,
 b2) at least one organohydrogen siloxane with at least two SiH units per molecule and at least one aromatic group is contained in the molecule,
 whereby the characteristics b1) and b2) are implemented in different organohydrogen siloxanes,
 c) at least one Pt, Ru and/or Rh catalyst,
 d) methacryloxypropyltrialkoxysilane.
 e) optionally at least one inhibitor,
 f). optionally at least one filler, optionally surface-modified, and
 g) optionally at least one additive,
whereby the molar ratio of the entire quantity of the SiH groups to the total quantity of Si-bound alkenyl groups of all components in the mixture is at least 0.7.

* * * * *